United States Patent
Krueger et al.

[11] Patent Number: 5,950,709
[45] Date of Patent: Sep. 14, 1999

[54] TEMPERATURE CONTROL WITH STORED MULTIPLE CONFIGURATION PROGRAMS

[75] Inventors: James H. Krueger, Plymouth; Jeffrey R. Meyer, Minneapolis; T. Michael Tinsley, Coon Rapids, all of Minn.

[73] Assignee: Honeywell Inc., Minneapolis, Minn.

[21] Appl. No.: 08/505,048

[22] Filed: Jul. 21, 1995

[51] Int. Cl.$^6$ .................................................. F25B 29/00
[52] U.S. Cl. ................ 165/11.1; 165/238; 165/240; 236/46 R; 236/49.3; 364/557; 62/127; 62/298
[58] Field of Search ..................... 165/11.1, 238, 165/240; 236/46 R, 49.3; 364/557; 62/127, 298

[56] References Cited

U.S. PATENT DOCUMENTS

| | | | |
|---|---|---|---|
| 4,181,957 | 1/1980 | Pinckaers . | |
| 4,386,649 | 6/1983 | Hines et al. ............................. | 165/12 |
| 4,421,268 | 12/1983 | Bassett et al. ............................ | 236/10 |
| 4,430,828 | 2/1984 | Oglevee et al. ........................... | 47/17 |
| 4,606,401 | 8/1986 | Levine et al. . | |
| 4,695,942 | 9/1987 | Levine et al. . | |
| 4,716,957 | 1/1988 | Thompson ............................ | 236/49.3 |
| 4,795,088 | 1/1989 | Kobayashi et al. ..................... | 236/49.3 |
| 4,873,649 | 10/1989 | Grald et al. ............................ | 364/505 |
| 4,911,358 | 3/1990 | Mehta ..................................... | 236/46 R |
| 4,948,040 | 8/1990 | Kobayashi et al. ..................... | 236/49.3 |

OTHER PUBLICATIONS

Honeywell, MagicStat®/32 Programming and Installation Instructions, 1994, U.S.A.
Honeywell, MagicState®/33 Programming and Installation Instructions, 1994, U.S.A.

*Primary Examiner*—John K. Ford
*Attorney, Agent, or Firm*—Kris T. Fredrick; Robert B. Leonard

[57] ABSTRACT

A thermostat which is configurable to be used with conventional fossil fuel furnaces, electric furnaces, heat pumps and other air conditioning equipment and fans. A setup program is included which requires an installer to enter data specific to the type of HVAC plant installed in the building with the thermostat.

9 Claims, 3 Drawing Sheets

5,950,709

TEMPERATURE CONTROL WITH STORED MULTIPLE CONFIGURATION PROGRAMS

BACKGROUND OF THE INVENTION

The present invention relates to the field of heating, ventilating and air-conditioning and more particularly to the area of temperature controls.

Thermostats have in more recent times have been constructed in two major components: a housing and a sub-base. Prior art FIG. 1 provides an example. The thermostat 200 included a housing 201 and a sub-base 202. The housing usually contained a temperature sensor (not shown), a display 215 and some form of a setpoint selection means, here shown as keys 206 through 211. The display and setpoint selection means were sometimes jointly referred to as the user interface. The sub-base included typically included wiring terminals to connect the thermostat to an HVAC plant. The HVAC plant may include any or all of the following: heat pump, air-conditioner, furnace (either fossil fuel or electric), boiler and fan.

An advance in the thermostat field occurred when a controller was used for control functions within a thermostat such as the thermostat described in U.S. Pat. No. 4,606,401 (Levine) issued Aug. 19, 1986 and commonly assigned with the present invention. The controller acted on preprogrammed instructions and stored, user entered parameters to control a temperature within a space to a desired setpoint at a given time. The controller generally used was a microprocessor.

Usually, a thermostat was configured to operate only with one type of HVAC plant at a time. For example, because of the differing control requirements for a heat pump, an electric furnace and a fossil fuel furnace, a thermostat was set up to handle only one of these types of HVAC plant. This led to a problem in that many different thermostats were then required to be manufactured to operate different HVAC plant types.

SUMMARY OF THE INVENTION

The present invention is a thermostat which includes controls and instructions such that it may operate with many different kinds of HVAC plants. The thermostat may be split into a separate user interface and subbase. The user interface includes a microprocessor with its own memory, data entry means, a display and read only memory. The subbase includes a microprocessor with its own memory, read only memory and a relay drive means.

Prior to leaving the factory, the subbase is programmed with configuration parameters in the read only memory. In particular, the read only memory is given information on whether the thermostat will be connected to a heat pump or a conventional HVAC plant and how many controlling relays are going to be configured for use.

At power up, the read only memory remote subbase uploads these parameters to the read only memory of the user interface panel. This read only memory stores a series of user prompts, selected ones of which are displayed to the installer. The user prompts request the installer to input information through the data entry means relating to various HVAC plant and thermostat parameters.

The read only memory of the remote subbase contains plural control programs for operating plural types of HVAC plants. Once the user enters the information requested by the user interface panel, this information is downloaded to the memory of the remote subbase. There, the parameters are accessed periodically for use in the control programs.

DESCRIPTION OF THE PREFERRED EMBODIMENT

Figure 1:
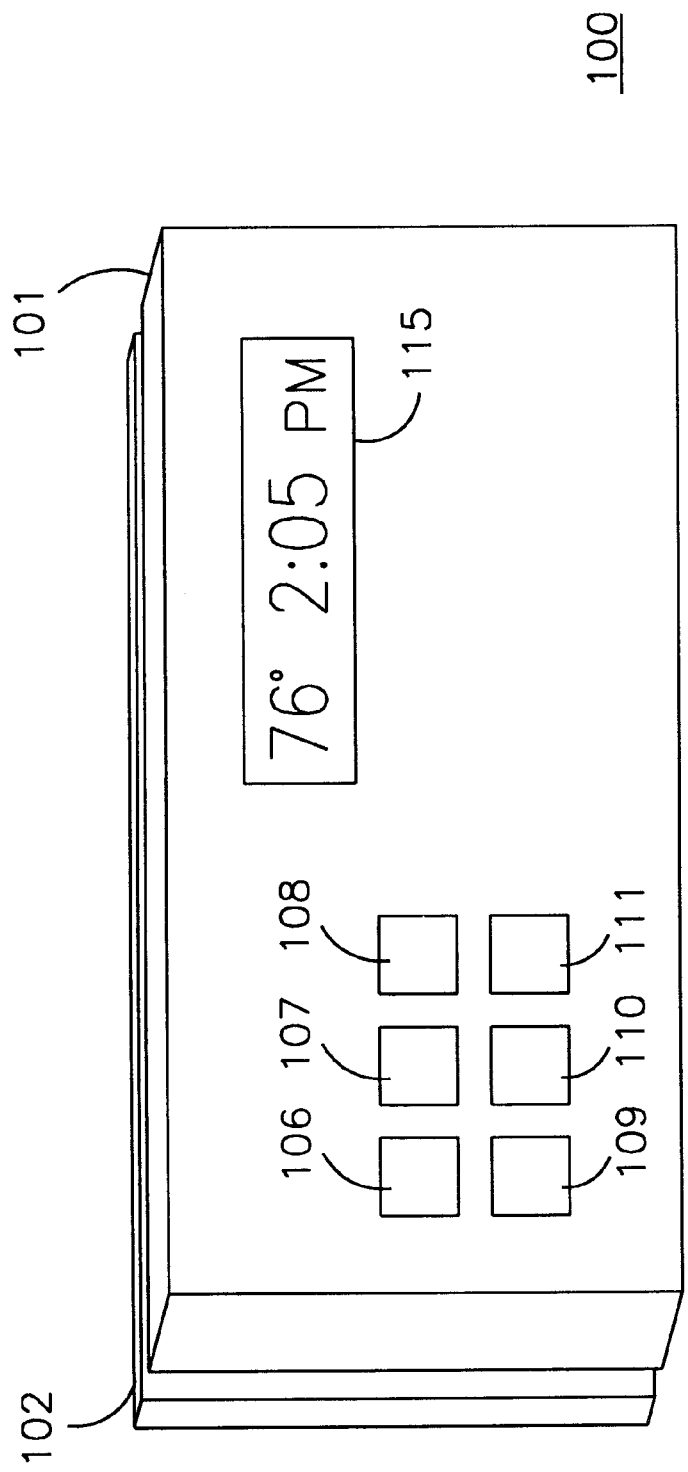
FIG. 1 is a perspective view of a thermostat of the prior art.
Figure 2:
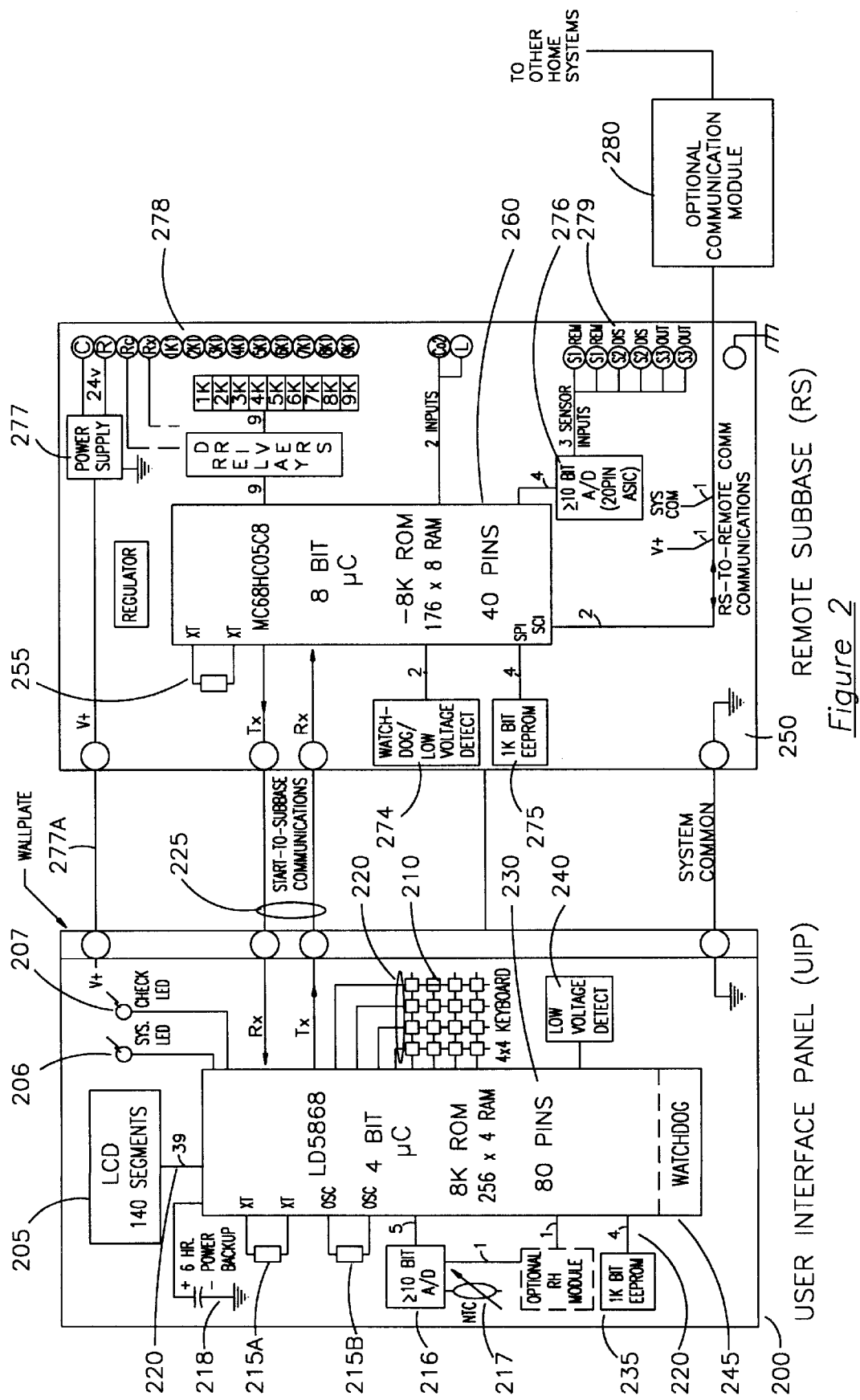
FIG. 2 is a block diagram of the user interface and the remote sub-base of the present invention.

Referring now to FIG. 2 there shown is a block diagram of the user interface and subbase portions of the present invention. The user interface includes display 205, status indicators 206 and 207, data entry means 210, clocks 215A and B, analog to digital converter 216, temperature sensor 217, power backup 218, first communication bus means 220, second communication bus means 225, and microprocessor 230, low voltage detect circuit 240 and watchdog circuit 245. The user may enter desired time, temperature or other relevant information (e.g. desired humidity) into the system through use of the data entry means and the display. The display shows relevant information such as setpoint, start time, current time and current temperature. In a preferred embodiment, the data entry means is a keyboard having a four by four matrix of keys and the display is a liquid crystal display having at least one hundred forty segments. The data entry means however could be one or more switches or a rotatable wheel assembly while the display may be made from a plurality of light sources such as light emitting diodes(LEDs). Further, status indicators 206 and 207 are preferably LEDs which are used to provide information on overall and safety system status.

In a preferred embodiment, the microprocessor will be an LC5868 four bit micro-controller having 8K Read Only Memory (ROM) and 256×4 Random Access Memory (RAM) and memory 235 will be a 1 Kbit EEPROM. The microprocessor memory is used, among other functions, to store instructions for microprocessor 230 operation, to display information on display 205, to accept input from the data entry means 210 and to communicate with the remote subbase 250. Memory 235 stores time and temperature pairs for controlling the temperature of the space to a desired temperature during a selected time period and other user entered parameters.

The clocks are used to provide real time information and a common time base. While only one clock is necessary, in a preferred embodiment, two clocks are used. One clock may be a continuous oscillator 215A, while the other clock may be a temporary oscillator 215B. The continuous oscillator 215A may be used to provide low power, low speed timing functions to the microprocessor while the temporary oscillator 215B may be used to provide high speed timing when sufficient power is available.

Other backup features include power backup 218, low voltage detect circuit 240 and watchdog circuit 245. Power backup 218, in a preferred embodiment is a capacitor having a six hour supply for the operation of the user interface. Low voltage detect circuit shuts down the microprocessor in the event of low voltage to avoid damaging the microprocessor and to prevent misoperation of the microprocessor. The watchdog circuit monitors internal microprocessor signals and ensures that they are at the appropriate frequency and resets the microprocessor if there is a problem.

The display, data entry means and memory all communicate with the microprocessor directly. This provides the benefit of fast communication among these devices as the microprocessor generally receives and processes information faster than it can be entered by a user. However, while the first communication bus means 225 is part of the microprocessor, other arrangements are possible where the first communication bus means is separate from the microprocessor so long as user entered information is displayed on the display a rate faster than information can be entered.

The subbase 250 includes clock 255, microprocessor 260, second communication bus means 225, watchdog/low voltage detect circuit 274, memory 275, analog to digital converter 276, power supply 277, relay driver means 278, and sensor means 279. Second communication bus means 225 is the electrical communication link with user interface panel using a protocol described below. The electrical communication link may be via wire, radio frequency communication, fiber optic link or the like.

Microprocessor 260, may be an 8 Kbit microcontroller such as an MC68HCO5C8 having 8 Kbit ROM and 176×8 RAM. This microprocessor controls operation of the HVAC plant operating on instructions which may be loaded at a factory into the microprocessor's ROM. These instructions may include such well known concepts as minimum on time, intelligent recovery and the like. The memory 275 may be a 1 Kbit EEPROM. The desired state of the HVAC plant is accomplished through appropriate electrical signals to the relay driver means 278. Timing of all functions is provided by clock 255, which may be a crystal oscillator.

Power supply 277 supplies power to all components needing power in the remote subbase. It also provides power via link 277A to the user interface panel 200.

Sensor means 279 allows sensors beyond the temperature sensor 217 of the user interface panel to control the operation of the system. As examples, a second temperature sensor, a humidity sensor or a carbon dioxide sensor may be connected. Memory 275 then would include instructions such as temperature averaging for the second temperature sensor case, or fan operation instructions for the humidity and/or carbon dioxide cases.

The protocol which is used to communicate between in the second bus means has as its goal to allow the remote subbase to be just a temperature controller without having to account for scheduling. This is done through use of a six hundred baud, five bit protocol. Four bits are used for the message and one bit is used as a start of message indicator. Both microprocessors have read and write memory access to the microprocessor RAM and the external memory (235, 275) of the other microprocessor. Information which is sent across the second communication bus means includes setpoints, period crossing flags, time to next change of period, current temperature and setup information such as model number and type.

It should be noted that while the preferred embodiment of the present invention is described with a separate user interface and subbase, a single piece thermostat with a single microprocessor is also contemplated. The invention resides in the ability of a thermostat to control multiple different types of thermostats, not in the separation of functions.

Figure 3:
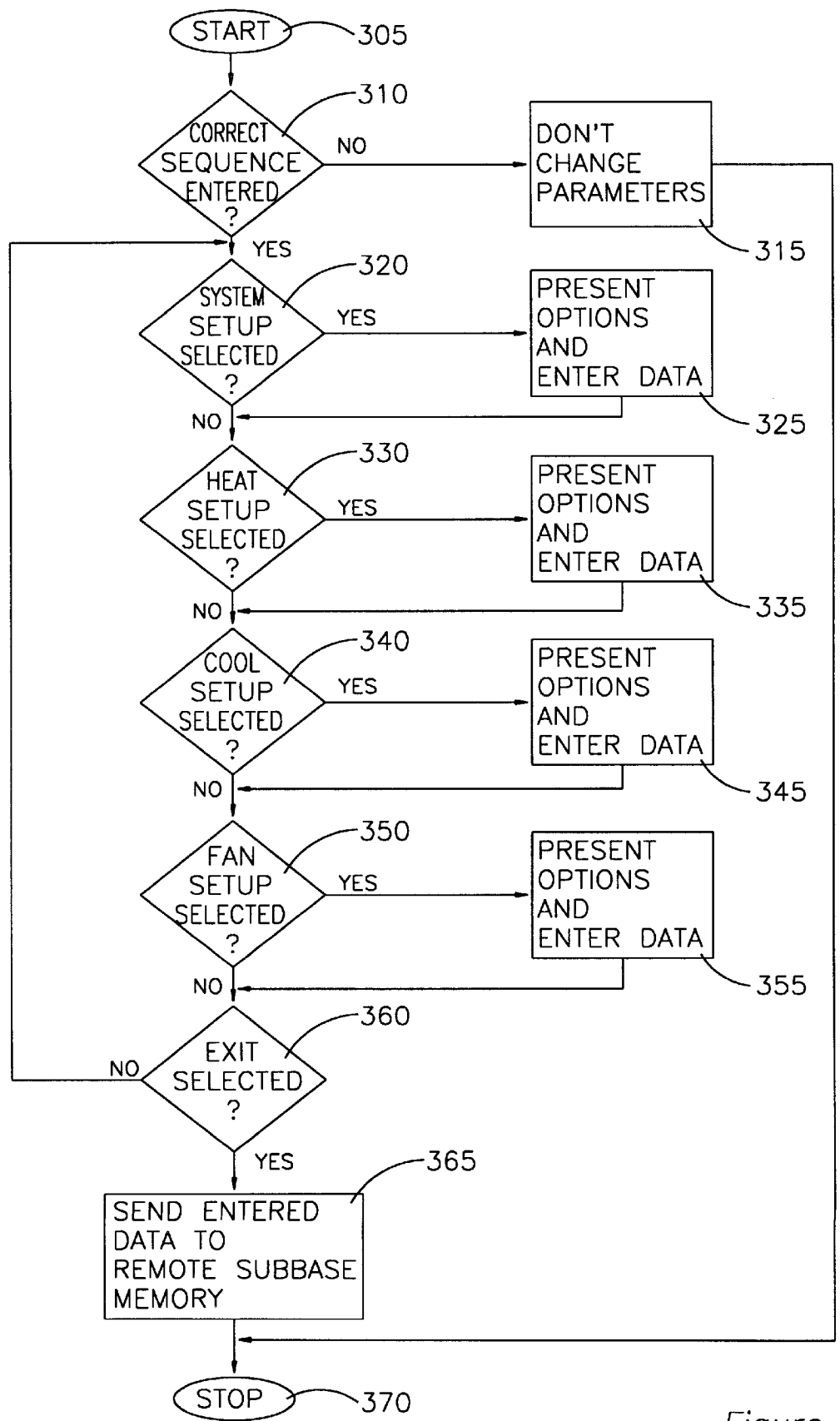
FIG. 3 is a flowchart of the process followed by the user interface to prompt for and receive configuration information.

Referring now to FIG. 3, there shown is a flowchart of the process used by an installer to set up the thermostat for installation. Four types of set up are allowed for in the present invention: System, Heat, Cool and Fan. After starting at block 305, the process determines whether an appropriate key sequence has been entered for the thermostat to go into set up mode at block 310. Any key sequence desired or a single key actuation can be used to enter the setup mode. Use of a predetermined key sequence can create the benefit of limiting access to the setup mode if desired.

If the appropriate key sequence or key is not entered, access to the set up mode is denied at block 315.

If so, the process moves into set up mode at block 320 and determines whether the system set up has been selected. If so, system set up parameters as described below are presented and selected at block 325. Movement through the parameters is controlled by a selected key from the data entry means.

If not, the process moves to block 330 to determine whether the heat set up has been selected. If so, heating set up parameters as described below are presented and selected at block 335.

If not, the process moves to block 340 to determine whether the cool set up has been selected. If so, cooling set up parameters as described below are presented and selected at block 345.

If not, the process moves to block 350 to determine whether the fan set up has been selected. If so, fan set up parameters as described below are presented and selected at block 355.

If not, the process moves to block 360 to determine whether the exit option has been selected. If so, entered parameters are sent to the read only memory in the remote subbase at block 365 and the process ends at 370. If not, the process returns to block 320.

If so desired, portions of the set up may be performed in the factory leaving only the system and fan set ups to be performed by the installer.

As noted above, many parameters may be entered by an installer. In the following charts of parameters, the following abbreviations are used

TABLE 1

| | |
|---|---|
| HP | The remote subbase is heat pump capable |
| HCTL | Both the W1 and Y1 relay drivers (of the subbase) are configured to be connected |
| CL | Y1 relay driver is configured to be connected |
| HT | W1 relay driver is configured to be connected |
| HPHT | HP and HT |
| NHPH | HT and not HP |
| VNT | The remote subbase is outdoor ventilation control capable |
| RSEN | A remote space temperature sensor has been selected. |
| HHUM | The remote subbase is heating humidity control capable |
| CHUM | The remote subbase is cooling humidity control capable |

In the following tables, the type refers to the abbreviations noted in table 1. The DISPLAY and OPTION columns show what is displayed on the display of the user interface. SCROLLING refers to what effect the selection of a key intended for use in moving through the items shown on the display has on the display. CIRCULAR means that repeated actuation of the above described movement key causes the options to rotationally appear on the display. STRAIGHT means that at one end of the possible OPTIONS, further actuation of the movement key will have no effect. The DESCRIPTION column provides a definition for the abbreviation used in the DISPLAY column.

The system set up parameters include:

TABLE 2

| TYPE | DISPLAY | OPTIONS | SCROLLING | DESCRIPTION |
|---|---|---|---|---|
| HTCL | AUTO SYS N | Y N | CIRCULAR | auto changeover capable |
|  | MIN OFF Y | Y N | CIRCULAR | enforce minimum compressor off time |
|  | SENS REM N | Y N | CIRCULAR | use remote space temperature sensor |
|  | SENS DIS N | Y N | CIRCULAR | use discharge air temperature sensor |
| RSEN | SENS LOC Y | Y N | CIRCULAR | use local space temperature sensor |
|  | SENS OUT | Y N | CIRCULAR | outdoor temperature sensor is present |
| VNT | VENT ERV | DMP ERV NO | CIRCULAR | outdoor air ventilation capability: damper, energy recovery ventilator, or none |
|  | COMM N | Y N | CIRCULAR | communications module connected. |
| HP | REV VLV B | B O | CIRCULAR | reversing valve output energized on heating (B) or cooling (O) |
| HHUM | HEAT HUM Y | Y N | CIRCULAR | humidity control enabled in heating mode |
| CHUM | COOL HUM Y | Y N | CIRCULAR | humidity control (with reheat) enabled in cooling mode |
|  | SHOW TMP F | F C | CIRCULAR | temperature scale (C/F) selection |
|  | SHOW CLK 12 | 12 24 | CIRCULAR | time scale (12/24) selection |
|  | RECOVERY | Y N | CIRCULAR | intelligent recovery (Y/N) selection |

The following are parameters entered in setting up the heat mode:

TABLE 3

|  | DISPLAY | OPTIONS | SCROLLING | DESCRIPTION |
|---|---|---|---|---|
|  | W1 CPH 6 (conventional) W1 CPH3 (heat pump) | 9 6 4.5 3 2.5 2 1.5 1 NC | STRAIGHT | cycles per hour on first heating stage. NC indicates the stage is not connected to any equipment |
| HT | W2 CPH 6 (conventional) W2CPH3 (heatpump) | 9 6 4.5 3 2.5 2 1.5 1 NC | STRAIGHT | cycles per hour on second heating stage. NC indicates the stage is not connected to any equipment |
| HPHT | AUX CPH 9 | 9 6 4.5 3 2.5 2 1.5 1 NC | STRAIGHT | cycles per hour on third heating stage. NC indicates the stage is not connected to any equipment |
| HPHT | BMHT CPH 9 | 9 6 4.5 3 2.5 2 1.5 1 NC | STRAIGHT | cycles per hour on emergency heat (E) heating stage. NC indicates the stage is not connected to any equipment. Must be configured if jumpered to auxiliary heat system |

The following parameters are entered into the thermostat at setup for the COOL mode:

TABLE 4

| | DISPLAY | OPTIONS | SCROLLING | DESCRIPTION |
|---|---|---|---|---|
| | Y1 CPH 3 | 9 | STRAIGHT | cycles per hour on first cooling stage. NC indicates the stage is not connected to any equipment |
| | | 6 | | |
| | | 4.5 | | |
| | | 3 | | |
| | | 2.5 | | |
| | | 2 | | |
| | | 1.5 | | |
| | | 1 | | |
| | | NC | | |
| CL | Y2 CPH 3 | 9 | STRAIGHT | cycles per hour on second cooling stage. NC indicates the stage is not connected to any equipment |
| | | 6 | | |
| | | 4.5 | | |
| | | 3 | | |
| | | 2.5 | | |
| | | 2 | | |
| | | 1.5 | | |
| | | 1 | | |
| | | NC | | |

For fan set up, the following parameters are entered:

| | DISPLAY | OPTIONS | SCROLLING | DESCRIPTION |
|---|---|---|---|---|
| NHPH | ELEC HT Y | Y | CIRCULAR | run fan with conventional heating stages |
| | | N | | |
| CL | OVER RUN N | Y | CIRCULAR | fan overrun after cooling stages are de-energized |
| | | N | | |

In summary, foregoing has been a description of a novel and unobivious temperature control device. This description is meant to provide examples, not limitations. The applicant define their invention through the claims appended hereto.

We claim:

1. A temperature control device for controlling the operation of an HVAC plant such that a desired temperature is maintained, comprising:
    a user interface having a first microprocessor, a display, first read only memory and data entry means connected to the first microprocessor, the first microprocessor controlling the operation of the user interface; the first read only memory storing time and temperature pairs for control of the HVAC plant entered by a user through the data entry means; and
    a subbase operably connected to the user interface and having a second microprocessor and second read only memory, said second read only memory storing a plurality of control programs used by the second microprocessor for controlling different types of HVAC plants and a setup process which is initiated by actuation of a predetermined key sequence of the data entry means, causes the display means to display a plurality of options and receives inputs at the first read only memory from the data entry means representative of system, heating, cooling and fan parameters, the first microprocessor upon completion of the setup process transmitting the information to the second read only memory.

2. The temperature control device of claim 1 wherein said subbase connection is by radio frequency transmissions.

3. The temperature control device of claim 1 wherein said subbase connection is by fiber optic link.

4. The temperature control device of claim 1 wherein said user interface further includes a power backup for providing power in the event of main power loss.

5. The temperature control device described in claim 1 further comprising a communication module operably connected to said temperature control device for communication between the temperature control device and other remote systems.

6. The temperature control device described in claim 1 wherein said subbase further includes terminals for electrically connecting various HVAC plants to said temperature control device.

7. The temperature control device described in claim 1 wherein said display means is a liquid crystal display.

8. The temperature control device described in claim 1 wherein said display means comprises light emitting diodes.

9. A method of initializing a temperature control device having a user interface, display means for data entry, and subbase containing a read only memory storing configuration parameters, comprising:
    operably connecting the user interface to the subbase;
    transmitting configuration parameters from the subbase to the user interface;
    displaying system setup parameters;
    accepting information about system setup parameters entered through the means for data entry;
    displaying heating setup parameters
    accepting information about heating setup parameters entered through the means for data entry;
    displaying cooling setup parameters
    accepting information about cooling setup parameters entered through the means for data entry;
    displaying fan setup parameters
    accepting information about fan setup parameters entered through the means for data entry and
    transmitting said accepted information to the read only memory device in said subbase.

* * * * *